United States Patent [19]
Fujimoto et al.

[11] 4,039,710
[45] Aug. 2, 1977

[54] NOVEL RESINOUS MATERIAL

[75] Inventors: Yasuo Fujimoto, Yokohama; Keizo Tatsukawa, Machida; Koichi Nagaoka, Nishinomiya; Masayuki Nagumo, Tokyo; Kiichi Nagai, Nagoya, all of Japan

[73] Assignee: Kyowa Hakko Kogyo Co., Ltd., Japan

[21] Appl. No.: 553,931

[22] Filed: Feb. 28, 1975

Related U.S. Application Data

[62] Division of Ser. No. 292,783, Sept. 27, 1972, Pat. No. 3,945,952.

[30] Foreign Application Priority Data

Oct. 1, 1971    Japan ................................. 46-76254
Jan. 10, 1972   Japan ................................. 47-4654

[51] Int. Cl.$^2$ ........................ B05D 3/02; B32B 27/38
[52] U.S. Cl. ..................................... 428/253; 427/342; 427/386; 427/390 R; 428/413; 428/265; 427/381
[58] Field of Search ............. 260/2 N, 2 BP, 29.2 EP, 260/47 EN, 830 P, 18 PF, 6, 7; 427/342, 386, 390 R, 381; 428/265, 413, 253

[56] References Cited

U.S. PATENT DOCUMENTS

| | | | |
|---|---|---|---|
| 3,203,912 | 8/1965 | Mark et al. | 427/386 X |
| 3,298,854 | 1/1967 | Marzocchi et al. | 427/386 X |
| 3,449,281 | 9/1969 | Sullivan et al. | 260/830 P |
| 3,480,471 | 11/1969 | Rembold | 427/386 |
| 3,843,391 | 10/1974 | Toepfl et al. | 427/386 X |
| 3,843,396 | 10/1974 | Mueller et al. | 427/386 X |

Primary Examiner—Michael R. Lusignan
Attorney, Agent, or Firm—Craig & Antonelli

[57] ABSTRACT

A method for preparing a novel compound, i.e. a resinous material, characterized in that an epoxy compound is allowed to react with ammonium salt or a metal salt (for example, lithium salt, sodium salt, potassium salt, magnesium salt, etc.) of polyglutamic acid. The resulting reaction product is useful in a method for treating shaped materials especially polyester textiles. In this method the shaped materials are treated with the novel resinous material to improve the appearance and handling characteristics thereof. A process for providing a wooly finish on polyester textiles is characterized by treating textiles (including polyester knittings and mixed spun fabrics or knittings or mixed woven fabrics or knittings) in a bath of an emulsified mixed solution of an epoxy compound and a metal salt of polyglutamic acid containing a catalyst, and carrying out a heat-treatment of the resulted textiles after pre-drying.

27 Claims, 1 Drawing Figure

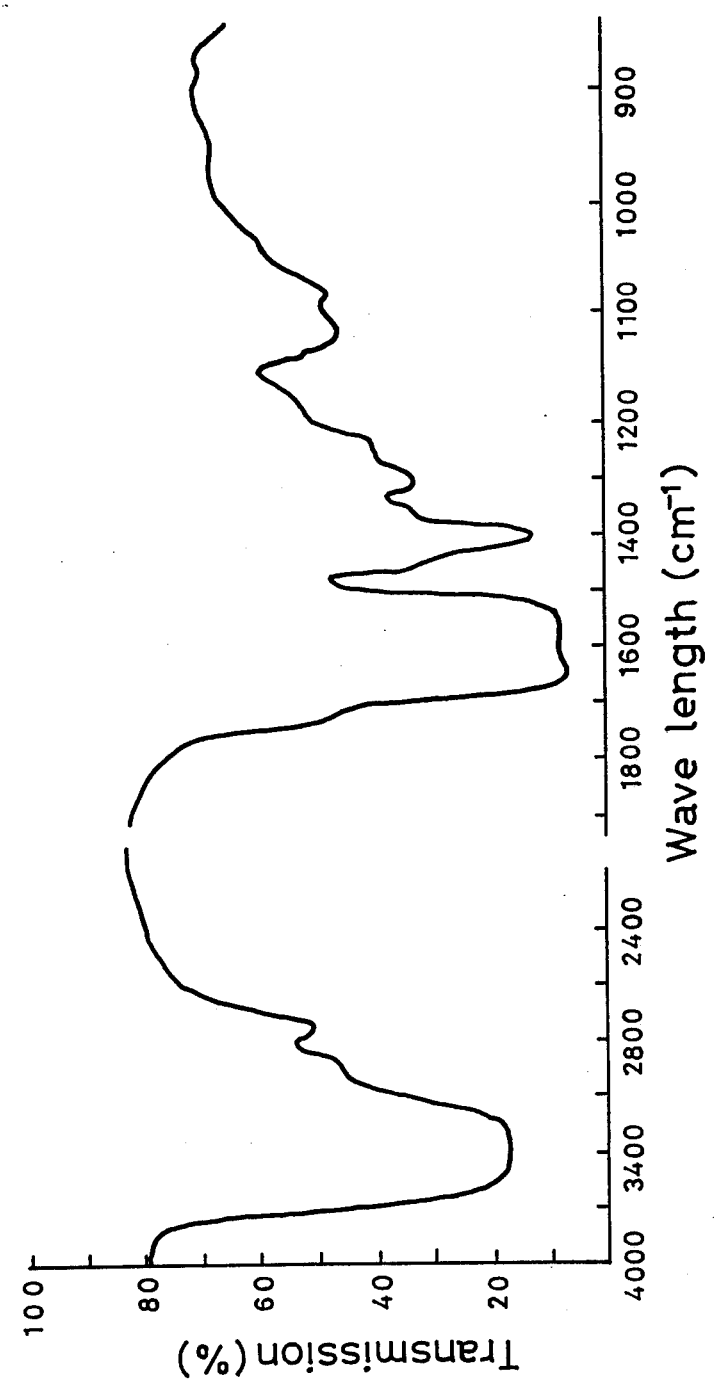

NOVEL RESINOUS MATERIAL

This is a division of application Ser. No. 292,783, filed Sept. 27, 1972, now U.S. Pat. No. 3,945,952, patented Mar. 23, 1976.

The present invention relates to a method for preparing a novel resinous material which is a reaction product obtained by allowing an epoxy compound to react with a water soluble salt of polyglutamic acid such as ammonium salt and metal salts thereof (including lithium, sodium, potassium, magnesium salts and the like.) (The salts of polyglutamic acid will be hereinafter referred to as PGS.) The structure of the novel reaction product or compound obtained by allowing an epoxy compound to react with PGS has not yet been clarified in detail. However, it has been found that this product has quite different properties from those of both of the starting materials.

In accordance with the present invention the PGS used is soluble in water. On the other hand, most of epoxy compounds are insoluble in water. When a water soluble epoxy compound is employed, the compound is dissolved in water. When a water insoluble epoxy compound is employed, the compound is dissolved in a small amount of a hydrophobic organic solvent or in an amount of a hydrophilic organic solvent several times greater than the amount of the epoxy compound, and then a suitable surfactant is added to the thus obtained solution. Either solution of the epoxy compound prepared as noted above is added to an aqueous solution of PGS to obtain an emulsion. A conventional catalyst for curing an epoxy resin such as an amine (which will be hereinafter referred to simply as a catalyst) is added to the emulsion and then the emulsion is subjected to reaction, if necessary with heating up to about 80° C, to partially convert the emulsion into a polymer having a low degree of polymerization, that is, a prepolymer. Suitable reaction time is several minutes, i.e. about 3 minutes to about 24 hours, but preferably within the pot life time of the epoxy compound, i.e. about 12 hours. Immediately after the reaction is completed, the mixture is quickly concentrated to dryness at 80° C or less. The resulted product is heated, if necessary, at 70° C to 90° C for several minutes for pre-drying and then heated for 1 to 10 minutes. The thus obtained white or pale yellow resinous material, which absorbs water and exhibits much swelling is found to be a quite novel compound or reaction product which is insoluble in water and common organic solvents.

Further, it has been found that the novel compound of the present invention can be utilized widely, for example, for treating or processing paper, natural leather, textiles including natural, artificial and synthetic fabrics, knitted good, thread, yarn, fiber and unwoven cloth, etc. to provide the materials with excellent touch and feel. For example, in the case wherein the novel compound is applied to a fabric as a treating agent, feel of the fabric is much improved. More particularly, the fabric is steeped in an emulsion containing a surfactant, an epoxy compound, PGS and a catalyst and, after the emulsion is swished off, the fabric is subjected to pre-drying at 70° C–90° C and thereafter to baking at 150° C for several minutes. The obtained fabric is subjected to soaping sufficiently with 0.5% aqueous solution of Marseille soap, wshed with water thoroughly and ironed after swishing water off and air-drying. The thus treated fabric is found to be remarkably improved in feel or handle when compared with a non-treated one.

Thus it will be appreciated that many attempts have been made to develop a method for processing polyester fabrics to have a soft, warm and voluminous feeling possessed by pure wool fabrics in order to apply polyester fabrics for outer-garments which have been manufactured exclusively of wool. The present invention can provide textiles with a feel and a resistance to wrinkling equivalent or superior to those of wool fabrics by treating the textiles with the novel compound, i.e. one formed by the reaction of an epoxy compound and a metal salt of polyglutamic acid. As heretofore noted, the chemical structure of the novel compound has been still unknown. However, a metal salt of polyglutamic acid, for example, sodium salt of polyglutamic acid, can be considered appropriate as a material for wooly finish, because the polypeptide structure of its main chain resembles the structure of wool itself, as shown by the general formula:

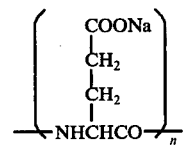

(wherein $n$ is a positive integer of from 15 to 3,500)

The reaction of sodium salt of polyglutamic acid and an epoxy compound in the presence of a catalyst is considered to be a cross-linking reaction in which opening of epoxy rings takes part, and therefore the reaction product provides textiles with an elastic resilience, softness, a resistance to washing and a resistance to dry cleaning.

By the following procedure, it is confirmed that other reactions than the above-mentioned reaction do not occur on the treated fabric. The similar operations as in the present invention, in which the combination of PGS, epoxy compound, surfactant and catalyst is employed, are carried out while using the five combinations of:

1. surfactant, epoxy compound, and catalyst;
2. PGS and catalyst;
3. catalyst;
4. PGS, surfactant, and catalyst;
5. sodium glutamate, epoxy compound, surfactant, and catalyst.

The obtained products are investigated on properties and chemical structures by the infra-red absorption spectrum analysis and the like. As a result, the novel compound which swells in water is found to be produced only when a combination of PGS, epoxy compound, surfactant and catalyst is used. Further, the similar fabrics as mentioned above are steeped in the above-mentioned five kinds of reaction solutions and subjected to drying, baking, soaping, washing and final drying, and then the treated fabrics are examined for feel or handle. As a result, it is found that those fabrics are harder in touch or remarkably inferior in feel when compared with the fabrics treated with the solution consisting of PGS, epoxy compound, surfactant and catalyst.

The water soluble ammonium or metal salts of polyglutamic acid above described and employed in the present invention may be either optically active or inactive.

Usually, such a salt is obtained by saponifying poly-γ-alkylglutamate with alcohol, aqueous alcohol or the like containing lithium hydroxide, potassium hydroxide, sodium hydroxide or the like and, if necessary the resultant product is converted to a desired form of salt such as ammonium salt, lithium salt, sodium salt, potassium salt, magnesium salt or the like by a suitable method. Alternatively, polyglutamic acid is produced by polymerizing directly glutamic acid by heating or by polymerizing glutamic N-carboxylic anhydride obtained by reacting glutamic acid with phosgene in an organic solvent, and the polyglutamic acid is converted into ammonium salt or a metal salt (lithium salt, sodium salt, potassium salt, magnesium salt, etc.) In general, the polymer, i.e. the polyglutamic acid has a molecular weight of from 2,000 to 500,000.

As an epoxy compound used in the present invention, any compounds having at least one vicinal epoxy group in the molecule are usable. The condensates of alcohol-compounds or phenol-compounds with epichlorohydrin or β-methyl epichlorohydrin are the examples of those commonly on the market, for example:

1. A compound having the general formula (I):

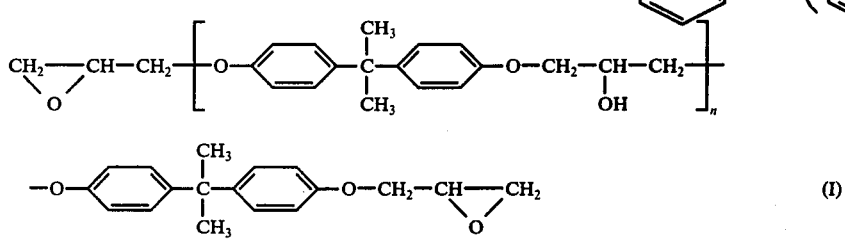

(I)

wherein n is an integer of 0 to 15.

2. A compound of halogenated bisphenol type having the general formula (II):

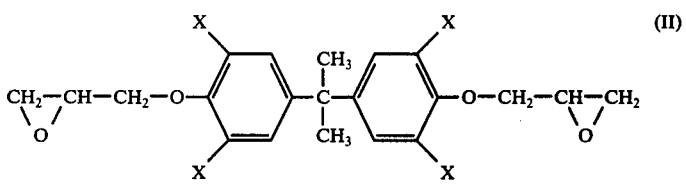

(II)

wherein X represents a halogen atom.

3. A compound of resorcin type having the formula (III):

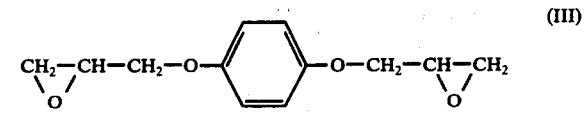

(III)

4. A compound of bisphenol F type having the formula (IV):

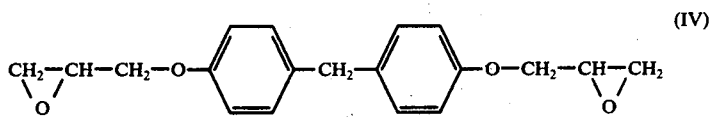

(IV)

5. A compound of tetrahydrophenylethane type having the formula (V):

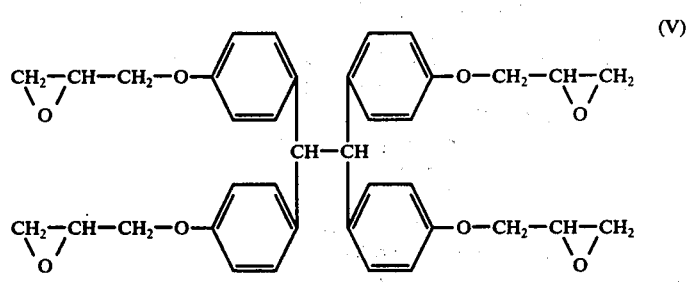

(V)

6. A compound of novolac type having the formula (VI):

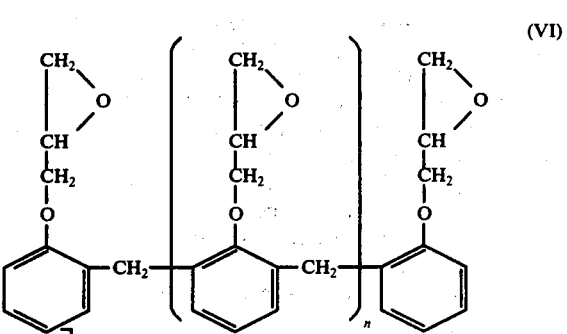

(VI)

wherein n is an integer of 0 to two.

7. A compound of oxyalkylene glycol type having the formula (VII):

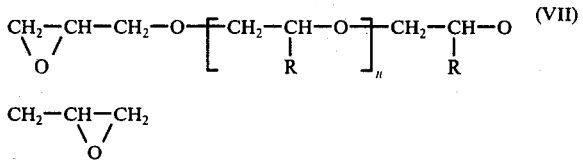

wherein R represents a hydrogen atom or an alkyl group (containing from 1 to 20 carbon atoms), and $n$ is an integer of 1 to 20.

8. A compound of glycerin-triether type, 1,2,3-tris(2,3-epoxy-propoxy)propane, having the formula (VIII):

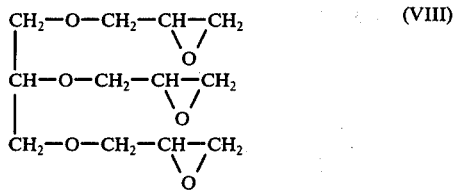

A compound of poly olefin type having the formula (IX):

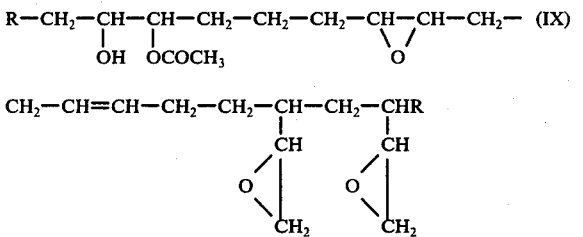

wherein R represents a hydrogen atom or an alkyl group of from 1 to 20 carbon atoms.

Further, soybean oil epoxide or alicyclic type compound such as vinyl cyclohexene dioxide, etc. may be also used as an epoxy compound.

As to process of treating textiles, it has been found that particularly effective results are obtained when the epoxy compound is a condensate of a phenolic compound or alcoholic compound with epichlorohydrin or β-methyl-epichlorohydrin.

The epoxy compound used in preparation of a treating solution for textiles is substantially insoluble in water and required to be emulsified in an aqueous solution to use in the present invention. For this purpose, a solvent capable of readily dissolving the epoxy compound and an emulsifier is used. Usually, aromatic hydrocarbons such as benzene, toluene, xylene, etc., and ketones such as acetone, methylisobutylketone, methyl ethyl ketone, etc. are used. Appropriate emulsifiers used in this aspect of the present invention are surfactants, preferably non-ionic or cationic surfactants.

As the catalyst, any conventional catalysts employed in the production of an epoxy resin, for example, mono- or diamines such as dibutylamine, propylamine, isopropylamine, n-butylamine, isobutylamine, modified polyamine compounds [for example, Epomate F-100 (trade name) produced by Ajinomoto Co.] and ammonium slats such as ammonium borofluoride ($NH_4BF_4$) and ammonium sulfamate; metal salts such as zinc borofluoride [$Zn(BF_4)_2$], sodium thiosulfate ($Na_2S_2O_3$) and potassium thiocyanate (KSCN); amine salts such as $C_2H_5NH_3{}^+BF_4{}^-$ and $C_6H_{11}NH_3{}^+BF_4{}^-$; organic acids or anhydrides thereof, etc. may be used. For the process of treating polyester textiles those catalysts having active hydrogen groups such as amines are preferred.

An epoxy compound, a material of the present invention is substantially insoluble or hardly soluble in water. Therefore, the compound is necessarily emulsified in an aqueous solution of PGS. The organic solvents to be employed are preferably those hydrophobic and capable of easily dissolving epoxy compounds and surfactants. Usually, aromatic hydrocarbons such as benzene, toluene, xylene, etc. and ketones such as acetone, methylisobutylketone, methylethylketone are used.

As for the surfactant used in the present process, there is no particular limitation. Any surfactant usually used for emulsifying an epoxy compound may be employed. Examples of these surfactants are cationic surfactants such as poly-oxyethylene alkyl amine type surfactants (for example, polyethylene lauryl amine) and quaternary ammonium salt type surfactants (for example, lauryltrimethyl ammonium chloride); and non-ionic surfactants such as polyoxyethylene alkylether type surfactants (for example, polyoxyethylene laurylether and polyoxyethylene oleylether), polyoxyethylene alkylphenol ether type surfactants (for example, octylphenol ether), polyoxyethylene acylether type surfactants (for example, polyethylene glycol monolaurate) and sorbitan fatty acid ester (for example, sorbitan monolaurate). When an epoxy compound is allowed to react with the solution of PGS without using a surfactant, the reaction does not proceed well.

It has been found that when a textile mainly consisting of polyester fibers is treated with the novel compound of the present invention, touch of the textile is remarkably improved as that of wool and further when other textiles are treated as above, they show respectively characteristic improved feel or handle.

In the present process, non-volatile matters (epoxy compound, PGS and catalyst) are usually used in a total amount up to 0.5–20 % by weight of the emulsion. The mixing ratio of the epoxy compound and PGS is not particularly limited, but usually from about 1–100 parts by weight of the PGS. The surfactant is usually used in an amont of 1–20 % by weight based on the weight of the solution of the epoxy compound. The catalyst is used in an amount of 0.1–100 % by weight based on the weight of the epoxy compound.

The present invention is illustrated by the following Examples but not limited thereby.

EXAMPLE 1

2.4 g of sodium salt of poly-L-glutamic acid [which will be hereinafter referred to as PSLG, and has a molecular weight of 35,000 and a reduced viscosity of 1.2 (which is measured at 20° C. after dissolving the PSLG in a 0.2 mol aqueous solution of sodium chloride, and the viscosities mentioned hereinafter are measured in the same manner as above.)] is dissolved in 320 ml of water. To said aqueous solution, the solution prepared by dissolving 2.4 g of Epikote 812, an epoxy compound (trade name, produced by Shell Chemical Co., U.S.A., a glycerin triether type epoxy compound having a mean molecular weight of about 306) and 0.4 g of Emulgen-420, a surfactant (trade name, produced by Kao Soap Co., Ltd., polyoxyethylene oleyl ether) in 5.2 g of o-xylene is added with stirring to obtain a white emulsion.

To the resultant emulsion, 40 g of an aqueous solution prepared by diluting a 45% aqueous solution of zinc borofluoride by 50 times with water is added dropwise for several minutes. The obtained solution is further diluted with water up to the total volume of 400 ml and thereafter divided into two portions.

One part of the solution is quickly evaporated to dryness in a rotary evaporator at a temperature below 50° C. to obtain 3.4 g of a milk-white solid. The solid is placed on a Petri dish and heated for pre-drying at 80° C. for about five minutes and then subjected to curing at 150° C. for three minutes, whereby 2.9 g of a milk-white solid is obtained. 200 ml of water is added to the obtained solid. The mixture is stirred for 30 minutes at room temperature. The insoluble is separated by filtration to obtain 1.2 g (weight in the dry state) of white water-insoluble flakes having a smooth surface and a water-swelling property. The white flakes which are insoluble but swell in water show an infra-red spectrum different from any of the infra-red spectra of the starting materials, therefore are assumed to be a novel compound consisting of PSLG and the epoxy compound. The resulting novel product is substantially insoluble in solvents such as water, alcohol, acetone, N,N-dimethylformamide, dimethylsulphoxide and chloroform. Thus, the product is different in such a character from the starting materials. Further, the product is insoluble also in toluene, xylene, etc.

From the filtrate, 1.2 g of white powders as well as a transparent oil is obtained by distilling off water in a rotary evaporator.

On the other hand, a test piece of each of: (1) rayon taffeta, (2) nylon taffeta, (3) acetate taffeta, (4) acryl knit, (5) combed-wool fabric, (6) polyester-wool fabric (4:6), (7) polyester-rayon fabric (4:6) and (8) polyester-cotton fabric (4:6) [the ratios in the parentheses are mixing ratios of the materials] is steeped in another portion of the emulsion for several minutes and, after the emulsion is lightly swished off, subjected to pre-drying at about 80° C. for 5 minutes. The thus treated test piece is subjected to curing at about 150° C. for 3 minutes after air-drying. Then the piece is subjected to soaping in 0.5% aqueous solution of Marseille soap and, after the solution is swished off, washed thoroughly with water, and finally air-dried and then ironed. All of the thus treated fabrics have more excellent touch and feeling when compared with the non-treated ones or those treated with the treating agent on the market.

FIG. 1 shows an infra-red absorption spectrum of the novel compound obtained in Example 1 measured by the KBr tablet method.

EXAMPLE 2

A reaction is carried out in the same manner as in Example 1 using 2.7 g of potassium salt of poly-D-glutamic acid (having a reduced viscosity of 1.1) in place of PSLG employed in Example 1, 2.4 g of Epikote 812, 5.2 g of o-xylene, 0.4 g of Emulgen 420 and 33.6 g of 1% solution of triethylene tetramine in place of zinc borofluoride, whereby is obtained 1.0 g of the same water insoluble compound as in Example 1.

Further, the same treatment as in Example 1 is carried out on the fabrics to obtain those having good feeling.

EXAMPLE 3

Procedures of Example 1 are repeated using ammonium sulfamate in place of zinc borofluoride. 1.2 g of a similar novel compound is obtained. The fabrics treated in the same manner show a touch of good feeling.

EXAMPLE 4

2.4 g of lithium salt of poly-L-glutamic acid (which will be hereinafter referred to as PLLG, and has a reduced viscosity of 1.1), 2.4 g of Epikote 828, an epoxy compound (trade name, produced by Shell Chemical Co., U.S.A., a condensate of epichlorohydrin and bisphenol A and having a mean molecular weight of about 380), 5.2 g of o-xylene, 0.4 g of Emulgen-420 and 33.6 g of 1% solution of triethylenetetramine are mixed, and divided into two portions. One portion is subjected to curing at 160° C. for about 6 minutes, whereby 0.8 g of a water insoluble novel compound is obtained.

Test pieces of the fabrics are steeped in the other portion of the mixture and treated in the same manner as in Example 1 to obtain the fabrics having good feeling.

EXAMPLE 5

Procedures of Example 4 are repeated by using ammonium or magnesium salt of polyglutamic acid in place of PLLG, and zinc borofluoride or ammonium sulfamate as a catalyst, whereby the similar results are obtained.

EXAMPLE 6

2.4 g of PSLG, 0.4 g of Emulgen-420, 5.2 g of o-xylene and 40 g of the dilute solution obtained by diluting 45% aqueous solution of zinc borofluoride 50 times with water are mixed (no epoxy compound is employed). The mixture is divided into two portions. One portion of the mixture is subjected to a reaction and the dried-up reaction product is further subjected to curing by heating. The resultant final product is easily soluble in water. Further, the fabrics treated in the similar manner as in Example 1 using the other portion of the mixture are hard in touch and accordingly remarkably inferior to the fabrics obtained in Example 1.

EXAMPLE 7

The same reaction as in Example 1 is carried out except PSLG is excluded, and the final product obtained after heat curing, is water soluble, transparent and heavily syrupy, different from the product in Example 1.

Further, the fabrics treated with the emulsion are remarkably inferior in feeling to those of Example 1.

EXAMPLE 8

The same reaction as in Example 1 is carried out except 2.4 g of sodium L-glutamate is used in place of PSLG, Different from the case in Example 1, a water soluble solid and a transparent heavy syrup are obtained as the final products after heat curing.

Further, the fabrics are treated in the same manner as in Example 1 with a half of the emulsion obtained according to the above, but the thus obtained fabrics are inferior in feeling to those of Example 1.

EXAMPLE 9

An emulsion is produced using PSLG, Epikote 812, Emulgen-420 and zinc borofluoride in the same manner as in Example 1. Test pieces of the fabrics, i.e. (1) all polyester filament fabric, (2) spun polyester-rayon fabric (6:4), (3) polyester-wool (6:4), (4) spun polyester fabric and (5) polyester-cotton fabric (7:3) are steeped in the obtained emulsion and treated in the same manner as in Example 1. All of the thus treated fabrics are found to be provided with such touch and feeling as those of woolen fabrics and to be more excellent in said properties than the non-treated fabrics.

EXAMPLE 10

Test pieces of various polyester fabrics of Example 9 are treated with the emulsions of Examples 2 and 3 to obtain the fabrics having excellent touch and feeling. The thus treated fabrics are superior to the non-treated ones.

EXAMPLE 11

Test pieces of various polyester fabrics of Example 9 are treated with the emulsion of Example 4. Thereby, are obtained the fabrics having much more excellent feeling than the non-treated ones.

EXAMPLE 12

Test pieces of various polyester fabrics of Example 9 are treated with the emulsion of Example 4 except ammonium salt of polyglutamic acid or magnesium salt of polyglutamic acid is used in place of PLLG, and zinc borofluoride or ammonium sulfamate is used as a catalyst. The fabrics excellent in feeling are obtained as in Example 11.

EXAMPLE 13

Various polyester fabrics of Example 9 are treated with the emulsion of Example 6. The thus treated fabrics are hard in touch and remarkably inferior in feeling to the fabrics of Example 9.

EXAMPLE 14

Various polyester fabrics of Example 9 are treated with the emulsion of Example 7. The thus treated fabrics are remarkably inferior in feeling to the fabrics of Example 9.

EXAMPLE 15

Various polyester fabrics of Example 9 are treated with the emulsion of Example 8. The thus treated fabrics are inferior in feeling to the fabrics of Example 9.

EXAMPLE 16

Procedures of each of Examples 1 and 9 are repeated using Ameet 105 (trade name, produced by Kao Soap Co. Ltd., chemical name: polyoxyethylene alkylamine) in place of Emulgen-420, a surfactant. Similar results are obtained.

EXAMPLE 17

Procedures of each of Examples 1 and 9 are repeated using Emunone 1112 (trade name, produced by Kao Soap Co. Ltd., chemical name: polyethylene glycol monolaurate) in place of Emulgen-420, a surfactant. Similar results are obtained.

EXAMPLE 18

Procedures of each of Examples 1 and 9 are repeated using Emal A (trade name, produced by Kao Soap Co., Ltd., chemical name: ammonium salt of lauryl sulphate) is used in place of Emulgen-420, a surfactant. Similar results are obtained.

EXAMPLE 19

Sodium salt of polyglutamic acid (intrinsic viscosity: 1.01, molecular weight: about 48,000, measured in 0.2M aqueous solution of sodium chloride at 25° C.), epoxy compound [Epikote 828 (phenolic epoxy compound) made by Shell Chemical Co.] and catalysts of (a) diamine (Epomate F-100, made by Ajinomoto Co.), (b), 45% aqueous solution of zinc borofluoride (made by Hashimoto Kasei Co.) and (c) ammonium sulfamate (made by Nitto Kagaku Kogyo Co.) are prepared. Epikote 828 is used in the form of a solution of a self-emulsifiable resin which is prepared as below.

Preparation of a solution of self-emulsifiable Epikote 828:

30 g of Epikote 828 is weighed out, and dissolved in 65 g of xylene. Further, 5 g of an emulsifier is added thereto. Emulgen 420 (made by Kao Soap Co.) is used as the emulsifier.

The respective reagents prepared above are mixed in the proportions as shown in Table 1, and finally their total amount is made up of 1 liter with water. Thus, treating solutions are obtained.

Table 1
Preparation of Treating Solutions

| Treating agents | Test Run | No. 1 | No. 2 | No. 3 |
|---|---|---|---|---|
| polyglutamate | | 3 g | 3 g | 3 g |
| epoxy compound | | 20 g | 20 g | 20 g |
| diamine (Epomate F-100) | | 4 g | | |
| zinc borofluoride (45%) | | | 4 g | |
| ammonium sulfamate | | | | 4 g |

Of course, the respective water-soluble reagents (for example, glutamate, diamine, etc.) may be allowed to be aqueous solutions in advance and thereafter mixed according to the composition ratios as shown in Table 1.

The treating solutions as prepared above are placed in treating bath-tubs. Polyester fabrics scoured and dried in advance are treated under the conditions of a bath temperature of 15°–30° C., pH 4.5–10, a squeezing ratio of 50–80%, a pre-drying temperature of 80° C., a heat-treating temperature of 150° C. and a heat-treating time of 30–180 seconds.

The test results are shown in Table 2

Table 2

| | Resistance to Wrinkling | |
|---|---|---|
| | Warp | Weft |
| Untreated cloth | 87.8% | 87.2% |
| Treated cloth (Test Run No. 1) | 90.1% | 89.5% |
| Treated cloth (Test Run No. 2) | 89.5% | 88.4% |
| Treated cloth (Test Run No. 3) | 90.5% | 89.5% |

The softness obtained in Test Run No. 3 is the highest and that in Test Run No. 2 is low. In Test Run No. 3, the reaction proceeds rather slowly. Therefore, practically the treating method of Test Run No. 1 is the best.

EXAMPLE 20

Similar procedures as Example 19 are repeated except using sodium salt of polyglutamic acid having an intrinsic viscosity of 1.4 and a molecular weight of about 74,000 and Epikote 812 (glycerin triether type epoxy compound, made by Shell Chemical Co.). Results as shown in Table 4 are obtained. The softness is increased, as compared with the case where Epikote 828 is used. The tendency of the resistance to wrinkling is the same as in Example 19. The treating solutions are prepared according to Table 3.

Table 3

Preparation of Treating Solution

| Treating agents | Test Run No. 4 | No. 5 | No. 6 |
|---|---|---|---|
| polyglutamate | 3 g | 3 g | 3 g |
| epoxy compound (Epikote 812) | 20 g | 20 g | 20 g |
| diamine (Epomate F-100) | 4 g | | |
| zinc borofluoride (45%) | | 4 g | |
| ammonium sulfamate | | | 4 g |

Table 4

Resistance to Wrinkling

| | Warp | Weft |
|---|---|---|
| Untreated cloth | 87.8% | 87.2% |
| Treated cloth (Test Run No. 4) | 90.5% | 90.0% |
| Treated cloth (Test Run No. 5) | 89.8% | 88.5% |
| Treated cloth (Test Run No. 6) | 90.8% | 90.0% |

EXAMPLE 21

Similar procedures as in Examples 19 and 20 are repeated using potassium salt (reduced viscosity: 1.20), lithium salt (reduced viscosity: 1.12) or magnesium salt (reduced viscosity: 1.05) in place of sodium salt of polyglutamic acid. The thus treated polyester fabrics have the almost same wooly feeling as those in Examples 19 and 20.

EXAMPLE 22

Procedures of Example 1 are repeated using 2.4 g of PSLG having an intrinsic viscosity of 0.3 and 2.4 g of PSLG having an intrinsic viscosity of 2.5 in place of the PSLG of Example 1, whereby the similar results are obtained.

EXAMPLE 23

The treating solution which has the same composition as that of Test Run No. 1 of Example 19 but the five times higher concentration, is prepared. The same treatment as in Example 19 is repeated using the thus prepared solution under the same conditions except that the squeezing ratio is 15-20%. Thus, the same result is obtained.

While the novel principles of the invention have been described, it will be understood that various omissions, modifications and changes in these principles may be made by one skilled in the art without departing from the spirit and scope of the invention.

What is claimed is:

1. A method for improving the touch and feel properties of textiles including natural, artificial and synthetic fabrics, knitted goods, thread, yarn, fiber and unwoven cloth comprising:
   forming a treating solution of
   1. an emulsion containing 0.5 - 20% non-volatile materials obtained by mixing
      i. a solution containing an epoxy compound and 1 - 20% weight of a surfactant based on said epoxy compound, and
      ii. an aqueous solution of a water-soluble salt of polyglutamic acid; and
   2. 0.1-100% weight of a catalyst based on said epoxy compound in said solution,
   impregnating the textile with said treating solution and thereafter heating said textile at 70°-170° C.

2. A process for providing a wooly finish on textiles including natural, artificial and synthetic fabrics, knitted goods, thread, yarn, fiber and unwoven cloth comprising:
   forming a treating solution of
   1. an emulsion containing 0.5-20% non-volatile materials obtained by mixing
      i. a solution containing an epoxy compound and 1 - 20% weight of a surfactant based on said epoxy compound, and
      ii. an aqueous solution of water-soluble salt of polyglutamic acid; and
   2. 0.1-100% weight of a catalyst being active in an opening reaction of the epoxy compound,
   impregnating the textile with said treating solution and thereafter heating said textile at 70 - 170° C. to cause reaction of said epoxy compound and said water-soluble salt.

3. A process for providing a wooly finish on textiles mainly consisting of polyester fibers comprising:
   forming a treating solution of
   1. an emulsion containing 0.5-20% non-volatile materials obtained by mixing
      i. a solution containing an epoxy compound and 1-20% weight of a surfactant based on said epoxy compound, and
      ii. an aqueous solution of water-soluble salt of polyglutamic acid; and
   2. 0.1-100% weight of a catalyst being active in an opening reaction of the epoxy compound,
   impregnating the textile with said treating solution and thereafter heating said textile at 70.- 170° C. to cause the reaction of said epoxy compound and said water-soluble salt.

4. The process of claim 2, wherein from about 1 to 100% by weight of the epoxy compound are reacted with from about 1 to 100 parts by weight of said water soluble salt of polyglutamic acid.

5. The process of claim 2, wherein about 0.1 to 100% by weight of said catalyst based on the weight of the epoxy compound is admixed with said emulsion.

6. The process of claim 2, wherein said water soluble salt of polyglutamic acid includes ammonia and metal salts of polyglutamic acid.

7. The process of claim 2, wherein said metal salts of polyglutamic acid include lithium, potassium, sodium, and magnesium salts.

8. The process of claim 2, wherein said solution of epoxy compound is prepared by dissolving the epoxy compound in water.

9. The process of claim 2, wherein said solution of epoxy compound is prepared by dissolving the epoxy compound in hydrophobic and hydrophilic organic solvents.

10. The process of claim 2, wherein said epoxy compound is a compound containing at least one vicinal epoxy group.

11. The process of claim 2, wherein said epoxy compound is a compound capable of forming an epoxy resin in the presence of said catalyst.

12. The process of claim 2, wherein said catalyst includes dibutylamine, propylamine, isopropylamine, n-butylamine, isobutylamine, modified polyamine compounds, ammonium borofluoride, zinc borofluoride, potassium thiocyanate, $C_2H_5NH_3^+BF_4^-$ and $C_6H_{11}NH_3^+BF_4^-$.

13. The process of claim 2, wherein said surfactant includes those surfactants capable of emulsifying said epoxy compound in an aqueous system.

14. The process of claim 2, wherein said treated textile is pre-dried at a temperature of from 70° to 90° C. for 60 to 600 seconds and then heated to a temperature of from 130° to 170° C. for a period of from 60 to 600 seconds to effect said reaction.

15. The process of claim 3, wherein from about 1 to 100% by weight of the epoxy compound are reacted with from about 1 to 100 parts by weight of said water soluble salt of polyglutamic acid.

16. The process of claim 3, wherein said catalyst is admixed with said emulsion.

17. The process of claim 3, wherein said water soluble salt of polyglutamic acid includes ammonia and metal salts of polyglutamic acid.

18. The process of claim 3, wherein said metal salts of polyglutamic acid include lithium, potassium, sodium, and magnesium salts.

19. The process of claim 3, wherein said solution of epoxy compound is prepared by dissolving the epoxy compound in water.

20. The process of claim 3, wherein said solution of epoxy compound is prepared by dissolving the epoxy compound in hydrophobic and hydrophilic organic solvents.

21. The process of claim 3, wherein said epoxy compound is a compound containing at least one vicinal epoxy group.

22. The process of claim 3, wherein said epoxy compound is a compound capable of forming an epoxy resin in the presence of said catalyst.

23. The process of claim 3, wherein said catalyst includes dibutylamine, propylamine, isopropylamine, n-butylamine, isobutylamine, modified polyamine compounds, $C_2H_5NH_3^+BF_4^-$ and $C_6H_{11}NH_3^+BF_4^-$.

24. The process of claim 3, wherein said surfactant includes those surfactants capable of emulsifying said epoxy compound in an aqueous system.

25. The process of claim 3, wherein said treated textile is pre-dried at a temperature of from 70° to 90° C. for 60 to 600 seconds and then heated to a temperature of from 130° to 170° C. for a period of from 60 to 600 seconds to effect said reaction.

26. A product obtained according to the process of claim 2.

27. A product obtained according to the process of claim 3.

* * * * *